April 21, 1931.  C. C. FARMER  1,801,852
CAR VENTILATOR CONTROL
Filed June 8, 1928
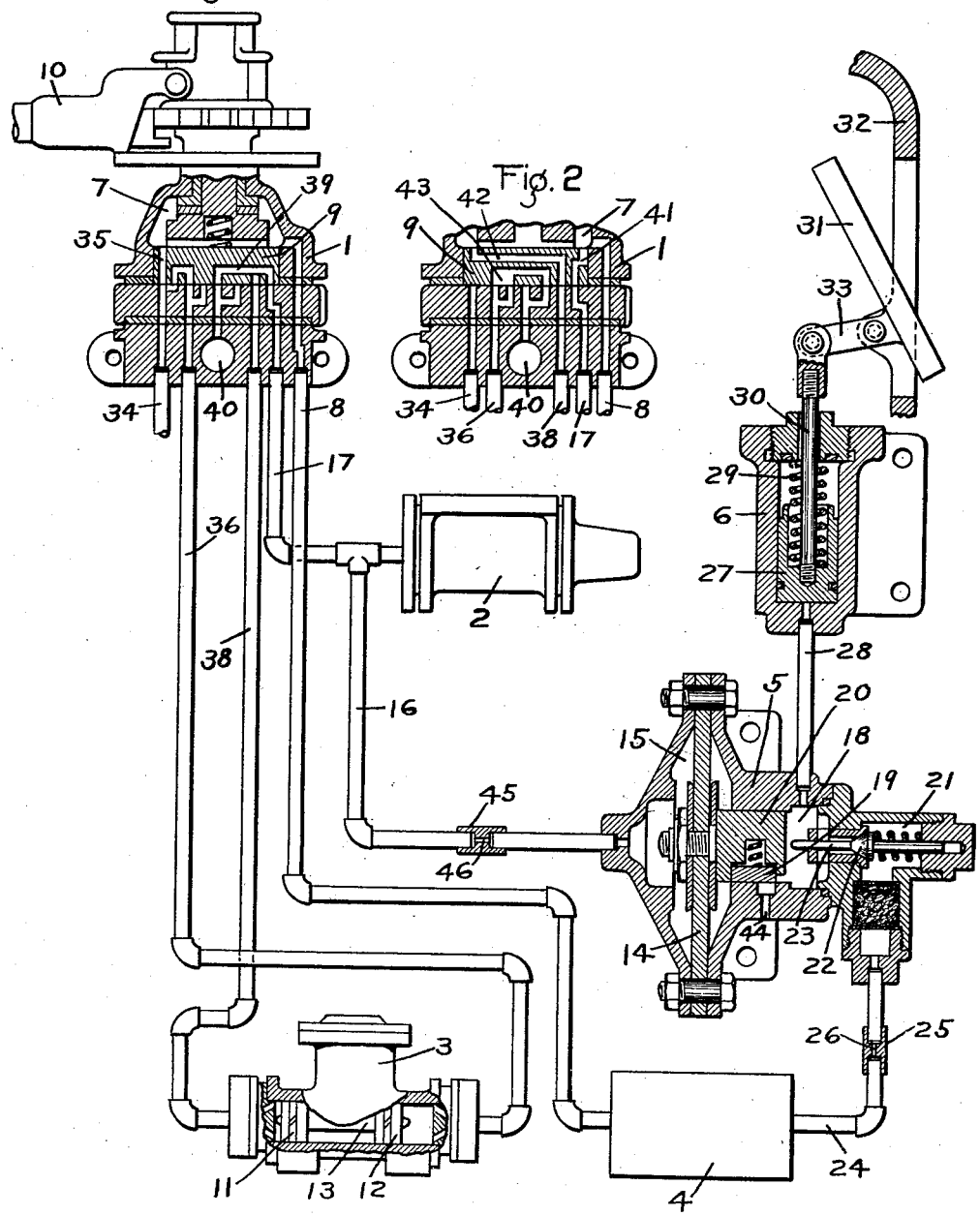
INVENTOR
CLYDE C. FARMER
BY *Wm. M. Cady*
ATTORNEY Patented Apr. 21, 1931

1,801,852

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

CAR-VENTILATOR CONTROL

Application filed June 8, 1928. Serial No. 283,761.

This invention relates to car ventilators and more particularly to means for automatically controlling a car ventilator.

When a car is brought to a stop and the car doors are opened, if the car ventilators are also open, a draft is liable to be created, which may be uncomfortable to the passengers in the car.

The principal object of my invention is to provide means, operating automatically when a car is brought to a stop and the car doors are opened, for closing the car ventilators and adapted to open the car ventilators when the car is again started.

In the accompanying drawing: Fig. 1 is a diagrammatic view, partly in section, of a car brake and door controlling equipment, showing my invention applied thereto; and Fig. 2 a sectional view of the brake and door controlling valve device in position for applying the brakes and opening the car doors.

The equipment illustrated in the drawing comprises a brake valve device 1, having means for controlling the car doors, a brake cylinder 2, a door engine 3, a main reservoir 4, a car ventilator controlling valve device 5, and a ventilator operator 6.

The brake valve device 1 may comprise a casing having a valve chamber 7, connected by pipe 8 to the main reservoir 4 and containing a rotary valve 9, adapted to be operated by a handle 10. The door engine 3 may be of the usual type, comprising a casing having a piston cylinder containing piston heads 11 and 12, connected together by a stem 13.

The stem 13 is operatively connected to the car doors, so that upon movement of the pistons to the left, the car doors are closed and upon movement to the right, the car doors are opened.

The ventilator controlling valve device 5 may comprise a casing containing a flexible diaphragm 14, having the diaphragm chamber 15 at one side connected through pipe 16 with pipe 17 leading to the brake cylinder 2 and having a valve chamber 18 at the opposite side, which contains a slide valve 19 adapted to be operated by a stem 20 secured to said diaphragm.

The casing also has a valve chamber 21, containing a poppet valve 22, provided with a stem 23 adapted to be engaged by the stem 20, when the diaphragm 14 moves toward the right.

The valve chamber 21 is connected by a pipe 24, containing a choke fitting 25 having a restricted port 26, with the main reservoir 4. The ventilator operator 6 may comprise a casing having a piston cylinder containing a piston 27, the chamber at one side of which is connected by pipe 28, with the valve chamber 18.

The piston 27 is urged downwardly by a spring 29, and secured to said piston is a stem 30. A car ventilator 31 is pivotally mounted on the car framing 32 and is provided with an operating arm 33, which is pivotally connected to the stem 30.

When the car is running along the road, the brake valve device is in release position, as shown in Fig. 1 of the drawing, in which the usual brake pipe 34 is connected through port 35 in the rotary valve 9 with valve chamber 7, so that the brake pipe is maintained charged with fluid under pressure.

The door closing pipe 36 is connected through cavity 37 in the rotary valve with the brake pipe 34, so that fluid under pressure is supplied to the piston 12 of the door engine 3. The door opening pipe 38 is connected through cavity 39 in the rotary valve with an atmospheric exhaust port 40, so that the piston 11 of the door engine is subject to atmospheric pressure and the door engine pistons 11 and 12 are maintained in their left hand position, as shown in the drawing, in which the car doors are held closed.

Pipe 17, leading to the brake cylinder 2, is also connected to exhaust port 40, through cavity 39, so that the brake cylinder is vented to the atmosphere and the brakes are held released.

The diaphragm chamber 15, being connected through pipe 16 with pipe 17, is at atmospheric pressure and there being no fluid pressure in valve chamber 18, the piston 27 is maintained in its downward position by spring 29, so that the car ventilator 31 is held in its open position, as shown.

When the car is brought to a stop and the brake valve device is turned to the position for holding the brakes applied and for opening the car doors, as shown in Fig. 2, the straight air pipe 17 is connected through port 41 in the rotary valve 9 with rotary valve chamber 7, so that the pressure in the brake cylinder is maintained.

A port 42 in the rotary valve also connects the rotary valve chamber with the door opening pipe 38, so that fluid under pressure is supplied to the piston 11 of the door engine. The door closing pipe 36 is connected through cavity 43 with exhaust port 40, so that the door engine pistons 11 and 12 are shifted to the right, causing the car doors to be opened.

Fluid under pressure supplied through pipe 17 to the diaphragm 14, causes the movement of said diaphragm, so that the stem 20 engages the stem 23 and the valve 22 is unseated. Fluid under pressure is then supplied from the main reservoir 4 through pipe 28 to the piston 27, which is thereby shifted upwardly, so as to effect the closure of the ventilator 31.

In order to release the brakes and close the car doors, preparatory to starting the car, the brake valve handle 10 is moved to release position, as shown in Fig. 1, and fluid under pressure is vented from the door opening pipe 38, while fluid under pressure is supplied to the door closing pipe 36. The door engine pistons 11 and 12 are thus shifted to the position for closing the car doors, as hereinbefore described.

Fluid is also released from the brake cylinder 2 and from the diaphragm chamber 15, so that the diaphragm 14 is shifted toward the left, by the fluid pressure in valve chamber 18. The slide valve 19 is then moved so as to uncover an exhaust port 44 and thereby fluid under pressure is vented from valve chamber 18 and from piston 27.

The piston 27 is thereupon shifted downwardly by the spring 29, so as to cause the ventilator 31 to be shifted to its open position.

A choke plug 45 having a restricted port 46 is interposed in pipe 16, so as to limit the rate of flow of fluid to the diaphragm 14 and thereby prevent the too sudden movement of the moving parts. The restricted port prevents excessive loss of fluid from the main reservoir in case of possible leakage.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a car ventilator and means for effecting an application of the brakes on the car, of means operated upon applying the brakes for closing said ventilator.

2. The combination with a car ventilator having an open and a closed position and means for effecting an application of the brakes on the car, of means operated upon applying the brakes for moving said ventilator to its closed position.

3. The combination with a car ventilator having an open and a closed position and means for effecting the application and release of the brakes on the car, of means operated upon applying the brakes for effecting the movement of said ventilator to its closed position and upon releasing the brakes for effecting the movement of said ventilator to its open position.

4. The combination with a car ventilator having an open and a closed position and a brake cylinder, of means for supplying fluid under pressure to the brake cylinder to effect an application of the brakes, and means operated by fluid under pressure supplied to the brake cylinder for effecting the movement of said ventilator to its closed position.

5. The combination with a car ventilator having an open and a closed position and a brake cylinder, of means for supplying fluid under pressure to the brake cylinder to effect an application of the brakes, a piston operated by fluid under pressure for effecting the movement of said ventilator to its closed position, and a valve device operated by fluid under pressure supplied to the brake cylinder for supplying fluid under pressure to said piston.

6. The combination with a car ventilator having an open and a closed position and a brake cylinder, of means for supplying fluid under pressure to the brake cylinder to effect an application of the brakes, a piston operated by fluid under pressure for effecting the movement of said ventilator to its closed position and upon venting fluid under pressure from said piston for effecting the movement of said ventilator to its open position, and a valve device operated by fluid under pressure supplied in applying the brakes for supplying fluid under pressure to said piston and operated upon the release of fluid under pressure for releasing fluid from said piston.

In testimony whereof I have hereunto set my hand, this 7th day of June, 1928.

CLYDE C. FARMER.